United States Patent
Winick et al.

(10) Patent No.: US 7,512,825 B2
(45) Date of Patent: Mar. 31, 2009

(54) RESPONDING TO DC POWER DEGRADATION

(75) Inventors: Bradley Dean Winick, Fort Collins, CO (US); Samuel David Naffziger, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 551 days.

(21) Appl. No.: 10/951,179

(22) Filed: Sep. 27, 2004

(65) Prior Publication Data

US 2006/0069928 A1    Mar. 30, 2006

(51) Int. Cl.
G06F 1/26    (2006.01)
G06F 11/30    (2006.01)

(52) U.S. Cl. .......................... 713/340; 714/10
(58) Field of Classification Search ................. 713/340; 714/10
See application file for complete search history.

(56) References Cited

U.S. PATENT DOCUMENTS

| | | | |
|---|---|---|---|
| 4,999,575 A * | 3/1991 | Germer | 324/142 |
| 5,539,910 A * | 7/1996 | Brueckmann et al. | 713/340 |
| 5,760,636 A * | 6/1998 | Noble et al. | 327/513 |
| 5,774,736 A | 6/1998 | Wright et al. | |
| 5,828,823 A * | 10/1998 | Byers et al. | 714/24 |
| 6,191,499 B1 | 2/2001 | Severson et al. | |
| 6,772,366 B2 * | 8/2004 | Nguyen et al. | 714/10 |
| 7,010,704 B2 * | 3/2006 | Yang et al. | 713/300 |
| 7,275,180 B2 * | 9/2007 | Armstrong et al. | 714/13 |
| 2002/0073347 A1 * | 6/2002 | Zafarana et al. | 713/300 |
| 2002/0073351 A1 * | 6/2002 | Oh | 713/500 |
| 2004/0019815 A1 | 1/2004 | Vyssotski et al. | |
| 2005/0208907 A1 * | 9/2005 | Yamazaki et al. | 455/126 |

FOREIGN PATENT DOCUMENTS

| | | |
|---|---|---|
| EP | 0256815 A2 | 2/1988 |
| EP | 0256815 A3 | 2/1988 |
| EP | 0404061 A2 | 12/1990 |
| EP | 0404061 A3 | 12/1990 |
| JP | 2003248632 A | 9/2003 |
| JP | 2004086456 A * | 3/2004 |

OTHER PUBLICATIONS

European Search Report for Application No. GB0518663.0 mailed on Oct. 31, 2005.

* cited by examiner

*Primary Examiner*—Thuan N Du

(57) ABSTRACT

Systems, methodologies, media, and other embodiments associated with detecting and responding to a degradation of a direct current provided to a frequency scalable processor are described. One exemplary frequency scalable processor includes a voltage regulating logic configured to request that a direct current having a reference voltage be provided to the processor. The example processor may also include a logic for detecting whether the voltage matches the reference voltage to within a desired tolerance and to selectively store processor state and/or data based on the detecting.

24 Claims, 8 Drawing Sheets

RESPONDING TO DC POWER DEGRADATION

BACKGROUND

Processors, like most integrated circuits, require a direct current to operate. A direct current (DC) may be produced by a power supply associated with a system in which the processor resides. While the power supply may produce a first direct current with a first voltage (e.g., 12V), a processor may require a different direct current with a second voltage (e.g., 5V, 2.5V, 1.25V). Thus, many computing systems may include a DC-DC converter that is configured to produce a second direct current from a first direct current.

While a processor may require a direct current with certain properties (e.g., 1.5V), it is to be appreciated that a "perfect" voltage may not be achievable and/or constantly maintainable. Thus, various properties may be acceptable in a direct current provided to a processor so long as they fall within a range that the processor can tolerate. For example, a direct current with a voltage of 1.5V+/−2% may be acceptable. However, if the direct current voltage falls outside the acceptable range, a processor may not be able to continue to operate properly. This may lead to a processor simply halting, which in turn may lead to the loss of data, state, and so on. The direct current voltage may fall out of a specified range due to reasons like, a component wearing out, a power supply becoming defective, and so on.

Certain types of processors may be referred to as charge-rationed processors. A charge-rationed processor may be, for example, a frequency scalable processor. These types of processors may require a direct current with properties that vary based on desired operating characteristics for the processor. For example, to operate at a first frequency, a charge-rationed processor may require a direct current with a first voltage. To operate at a second frequency, the charge-rationed processor may require a direct current with a second voltage. In general, higher operating frequencies require higher voltages and lower operating frequencies may be supported with lower voltages. There are definable relationships between the voltages, currents, frequencies, and so on, associated with charge-rationed processors. For example the equations:

$V=IR$, (where V=voltage, I=current, R=resistance)

$P=VI$, (where P=power), and $P \approx C\,f\,V^2$, (where f=frequency)

are useful for describing example relationships between various properties.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
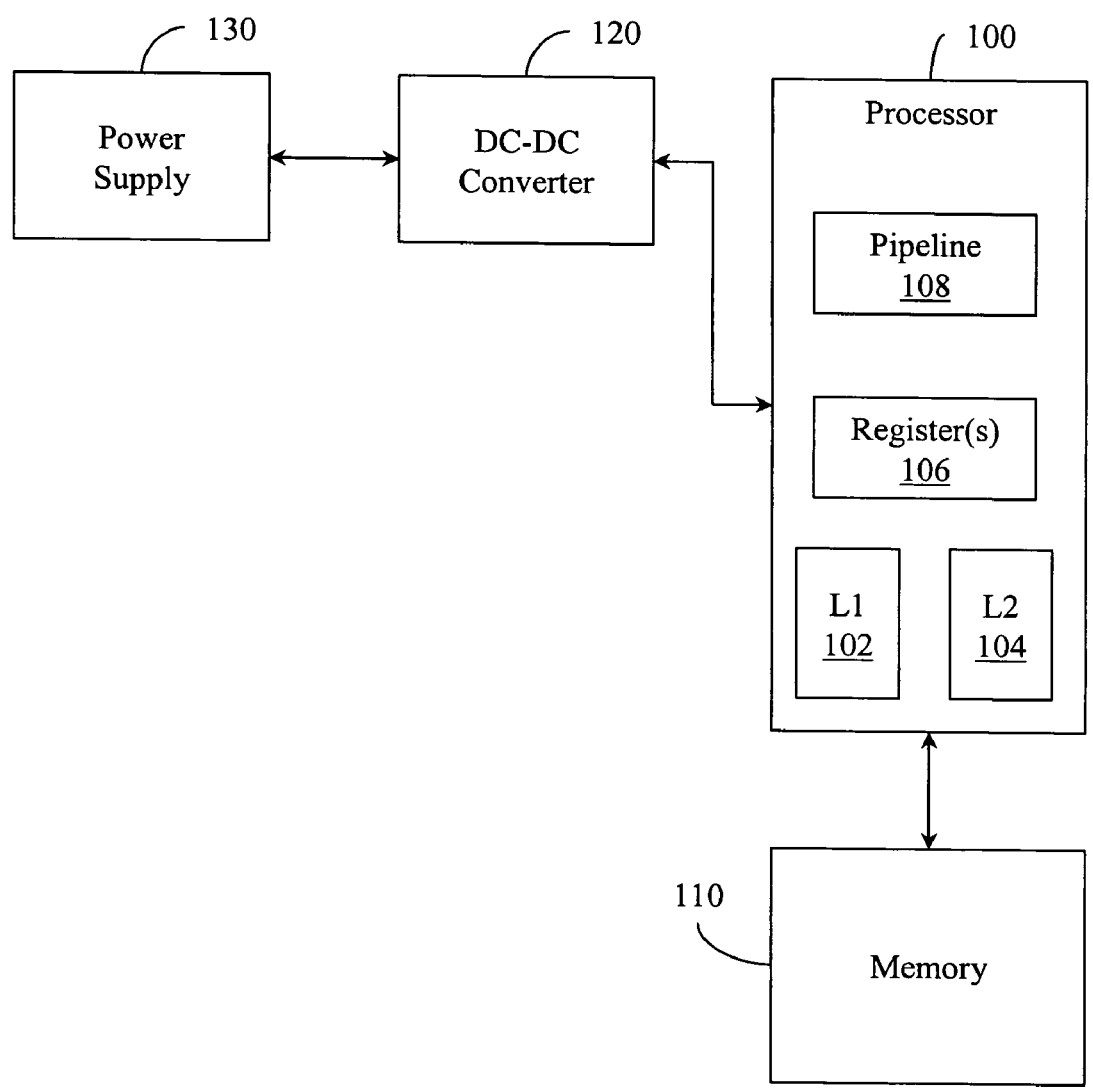
FIG. 1 illustrates an example processor configured to receive a direct current (DC) from a DC-DC converter.

A frequency scalable processor may operate at different frequencies. The frequency at which a frequency scalable processor operates may be related to the voltage of a direct current provided to the frequency scalable processor. For example, a higher frequency may require a higher voltage while a lower frequency can be supported by a lower voltage. A frequency scalable processor may be configured to program a direct current provider to provide a direct current having a desired voltage. Thus, an example frequency scalable processor may also be configured to detect when the direct current provided by the direct current provider is within acceptable tolerances with respect to the desired voltage. If the example frequency scalable processor detects that the provided direct current falls outside an acceptable tolerance (e.g., falls more than 5% below the desired voltage), then the frequency scalable processor may take an action(s) to avert potential data loss. The actions may include, for example, saving data (e.g., dirty cache lines) currently in the processor, saving processor state (e.g., architected state) associated with the processor, initiating a processor-to-processor migration of data and/or state, matching its operating frequency to the degrading direct current, and so on. Thus, rather than behaving like a conventional processor and simply failing when a provided voltage falls outside a desired range, an example frequency scalable processor may detect and respond to a degraded voltage, thus potentially mitigating damages associated with a direct current failure.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, semiconductor memories, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, DVD, other optical medium, punch cards, paper tape, other physical medium with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

FIG. 1 illustrates an example processor 100 that is configured to receive a DC voltage from a DC-DC converter 120. Processor 100 may be operably connected to and in data communication with a memory 110. Thus, data values may be read from memory 110 into processor 100 where they may be stored in a cache (e.g., L1 cache 102, L2 cache 104). The data values may also be manipulated by instructions executed by processor 100. The instructions may be arranged, for example, in an instruction pipeline 108. Processor 100 may also include a register(s) 106 that stores instruction addresses, branch addresses, memory addresses, control information, computation values, and so on. The instant contents of the caches, the register(s) 106, the instruction pipeline 108, and so on may be referred to as a state of processor 100, or a condition of processor 100.

Processor 100 may be supplied with a direct current from a DC voltage source like DC-DC converter 120. The DC source may in turn be supplied with a direct current from a power supply 130. Power supply 130 may provide a first direct current with a first voltage (e.g., 12V) to the DC-DC converter 120. The DC-DC converter 120 may then supply a second direct current with a second voltage (e.g., 5V) to processor 100. In some examples, processor 100 may be a frequency scaleable processor and thus may control DC-DC converter 120 to provide different direct currents with different voltages at different times to support frequency scaling.

Processor 100 may include a large number of transistors that may switch simultaneously. Thus power supply 130 and/or DC-DC converter 120 may be designed to meet large transient power requirements and to maintain a stable voltage supply during fast transients. In some examples, processor 100 may be programmed to control the DC-DC converter 120 to provide a direct current with a specified voltage. At various specified voltages, processor 100 may have a range of direct current voltages in which it can operate. However, processor 100 may have a voltage floor below which it cannot operate. Thus processor 100 may be configured to monitor the voltage of the direct current provided by DC-DC converter 120 and to respond when it does not meet desired properties. If the voltage provided by DC-DC converter 120 is not in a desired range of voltages (e.g., approaches the voltage floor), then a conventional processor may stop functioning.

Example processor 100 may be configured to detect a mismatch between the direct current provided by DC-DC converter 120 and a desired direct current. If the mismatch exceeds a certain tolerance (e.g., 5% too low), then processor 100 may respond in an attempt to save state and/or data associated with processor 100. For example, processor 100 may respond to save data like an architected state data, a dirty cache line data, an instruction queue data, and so on. Processor 100 may be configured to attempt to save this data in locations provided with a different direct current than that provided by DC-DC converter 120. By way of illustration, processor 100 may attempt to cause data to be provided to devices like a remote backup processor operably connected to processor 100 via a system bus, an independent random access memory (RAM) operably connected to processor 100, and a cache memory associated with processor 100. By way of further illustration, processor 100 may be configured to invoke a logical processor migration function available to the processor 100 whereby the contents of processor 100 are migrated to another processor that has a different direct current available. In one example, processor 100 may be an Itanium® family processor.

One example mismatch between the voltage provided by DC-DC converter 120 and a desired voltage may be the voltage of the direct current falling below a desired level. The voltage may drop because the power supply 130 is failing, the DC-DC converter 120 is failing, heating of various elements has increased the resistance in various components through which the direct current flows and so on. Thus, the degradation may occur instantaneously, gradually, intermittently, and so on. The degradation may also be one that is complete, like when a power supply fails and stops providing a direct current, or incomplete, like when thermal heating affects resistance in voltage providing elements. Processor 100 may detect the degradation and attempt to respond. The ability of processor 100 to respond depends, at least in part, on capacitance existing in processor 100, the packaging connecting the processor 100 to the converter 120, and/or DC-DC converter 120. The more capacitance available in these elements, the longer processor 100 may have to respond to the degradation. The rate at which the voltage available to processor 100 drops (e.g., the voltage slew rate), may depend, at least in part, on the capacitance of processor 100, the package, and/or DC-DC converter 120. One way in which processor 100 may respond is to successively lower its operating frequency based on the direct current available. As the voltage drops, the processor 100 can manipulate its frequency to follow the voltage down. Thus, rather than simply stopping, processor 100 may continue to execute some instructions during the degradation. The instructions may be used to save state, data, and so on.

Figure 2:
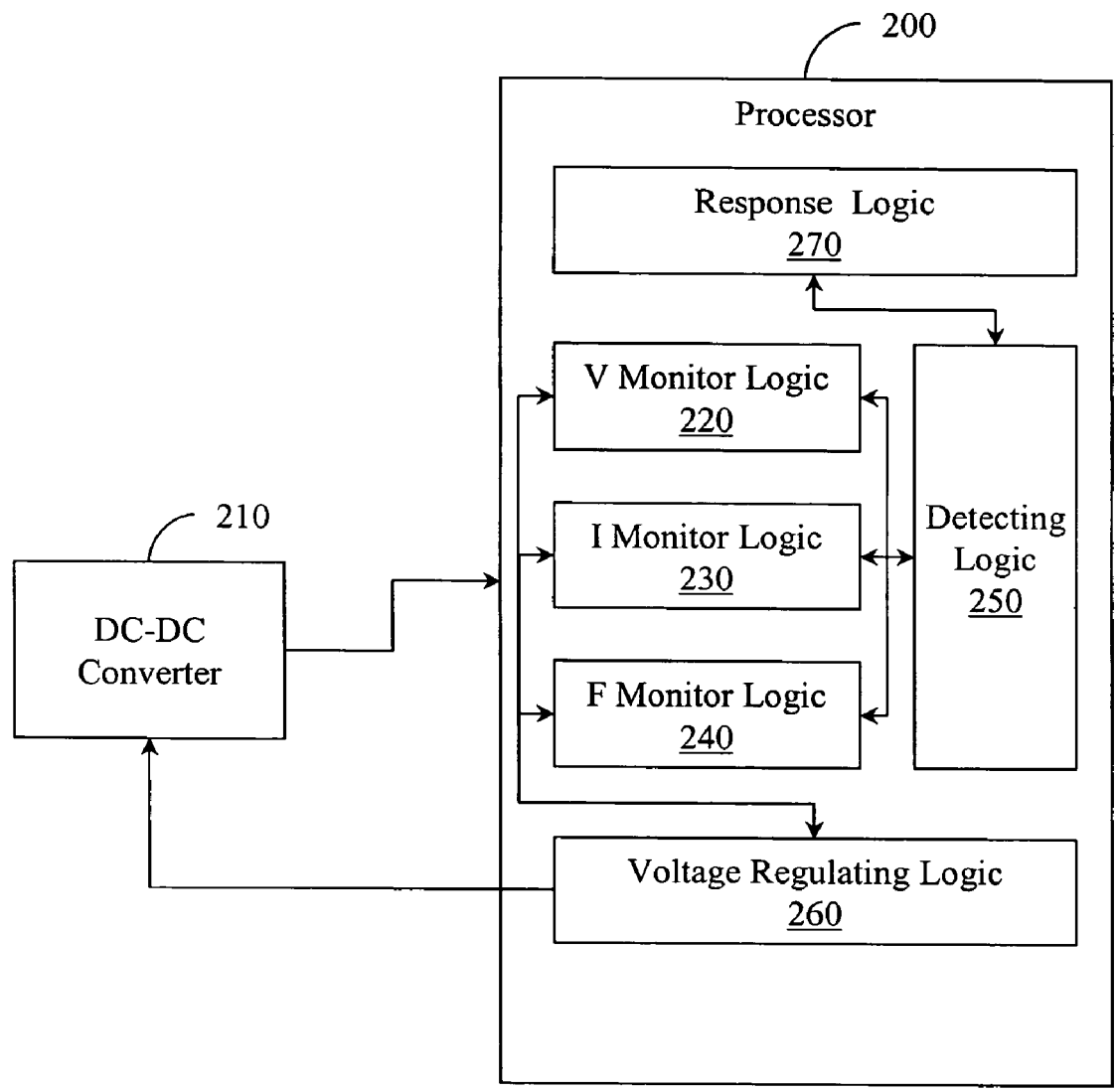
FIG. 2 illustrates an example frequency-scalable processor configured to detect a degradation in a provided direct current.

FIG. 2 illustrates an example frequency-scalable processor 200 that is configured to receive a direct current from a source like a DC-DC converter 210 and to detect a degradation (e.g., lessening) of the provided direct current resulting in a degraded voltage. The processor 200 may include a voltage regulating logic 260 that is configured to control the direct current provider 210 to provide a selected voltage. For example, processor 200 may be a frequency scaleable processor that is implementing a charge rationing protocol. Thus, processor 200 may be programmed to operate at different frequencies at different times to respond to various factors (e.g., load, temperature). Therefore, processor 200 may control DC-DC converter 210 to provide, at different times, a direct current with different voltages.

The ability of processor 200 to execute instructions at different frequencies allows processor 200 to respond to a dropping voltage. As the voltage drops, the processor 200 can drop its operating frequency and continue to execute instructions, even while DC-DC converter 210 and/or a power supply (not illustrated) are failing. The instructions may be associated with, for example, saving state and/or data associated with processor 200. Thus, processor 200 may include a response logic 270 that is configured to selectively cause a data item associated with processor 200 to be provided to a device supplied with a second direct current from a second direct current provider. Providing the data item to a device provided with a different direct current facilitates mitigating damages associated with the loss of voltage to processor 200. For example, if sufficient state and data can be saved to another device that has another voltage available, then a second processor may be able to acquire that state and data and pick up where processor 200 left off when the voltage loss was detected and responded to.

Processor 200 may include a detecting logic 250 that is operably connected to the voltage regulating logic 260 and the response logic 270. The detecting logic 250 may be configured to analyze the direct current provided to processor 200 by a voltage source like DC-DC converter 210. Detecting logic 250 may also be configured to selectively control the response logic 270 upon determining that the voltage of the direct current is less than it should be by an amount exceeding a tolerance. The selective control may include signaling response logic 270 to store state and/or data associated with processor 200. The selective control may include signaling response logic 270 to control processor 200 to lower its operating frequency proportionally to the lower voltage direct current available.

Processor 200 may program DC-DC converter 210 to provide processor 200 with a direct current with a voltage of 2.5V. If the detecting logic 250 determines that the voltage is, for example, only 2.25V, then the detecting logic 250 may control response logic 270 to try to save state and data. In one example, detecting logic 250 may consult a table (not illustrated) listing acceptable values for various programmed voltages. In another example, detecting logic 250 may compute a percentage of a reference voltage below which the provided voltage should not drop. While a table and an algorithmic approach are described, it is to be appreciated that detecting logic 250 may detect an action-worthy voltage drop using other techniques.

Since minor fluctuations in voltage are to be expected, in some examples detecting logic 250 may be configured to control response logic 270 after a degradation having a certain duration has occurred rather than an instantaneous degradation. In another example, processor 200 and detecting logic 250 may not wait for an actual degradation to occur, but may predict that a degradation is likely to occur based on historical data. For example, voltage data, current data, and frequency data may be examined for patterns or trends that indicate a pending DC-DC converter 210 failure and/or power supply failure. In another example, detecting logic 250 may control response logic 270 to attempt to save different amounts and/or types of data based on various conditions when a degradation is detected. By way of illustration, if a degradation is detected while processor 200 is operating at a first, higher frequency and being provided with a first, higher voltage, then processor 200 may have a first, longer amount of time in which to save state and/or data since processor 200 may be able to cycle down through a greater set of frequencies as the voltage drops towards the operating floor. By way of further illustration, if a degradation is detected while processor 200 is operating at a second, lower frequency and being provided with a second, lower voltage, then processor 200 may have a second, shorter amount of time in which to save state and/or data since processor 200 may only be able to cycle down through a lesser set of frequencies as the voltage drops towards the operating floor.

How quickly the voltage drops may depend on the capacitance present in processor 200 and/or DC-DC converter 210. In one example, detecting logic 250 and/or response logic 270 may calculate the voltage slew rate after a degradation to determine the type and/or amount of data to be saved. A faster slew rate may dictate that less data be saved, while a slower slew rate may allow more data to be saved. Additionally, the conditions existing at the time of degradation (e.g., voltage, frequency) and/or the slew rate may be considered when determining the destination for save data. A faster slew rate and lower voltage/frequency may require that data be saved to a device that can be accessed more quickly while a slower slew rate and higher voltage/frequency may allow data to be saved to a device whose access requires more time. To allow more time for responding to a degradation, processor 200 may, in some examples, include an additional capacitor that is controllable by the detecting logic 250. The additional capacitor may provide a temporary direct current for allowing the response logic 270 to save state and/or data.

To facilitate detecting that a degradation has occurred or is about to occur, and/or to facilitate responding to the degradation, detecting logic 250 may include a voltage monitor logic 220, a current monitor logic 230, and/or a frequency monitor logic 240. The voltage monitor logic 220 may monitor the voltage of the direct current provided by the DC-DC converter. Since the voltage regulating logic 260 is tasked with programming DC-DC converter 210 to provide a direct current with a desired voltage, voltage monitoring logic 220 may communicate with voltage regulating logic 260 concerning the desired voltage. Current monitoring logic 230 may monitor the current flowing to and/or in processor 200. Similarly, frequency monitoring logic 240 may monitor the frequency at which processor 200 is operating. Since voltage, current, and frequency have determinable relationships in a processor, detecting logic 250 may employ one, two, and/or all three of the voltage monitoring logic 220, the current monitoring logic 230, and the frequency monitoring logic 240 when deciding whether to control response logic 270. In one example, a first logic like voltage monitoring logic 220 may provide a first indication that a degradation has occurred. Detecting logic 250 may then double check the indication from the voltage monitoring logic 220 by examining data available from the current monitoring logic 230.

Figure 3:
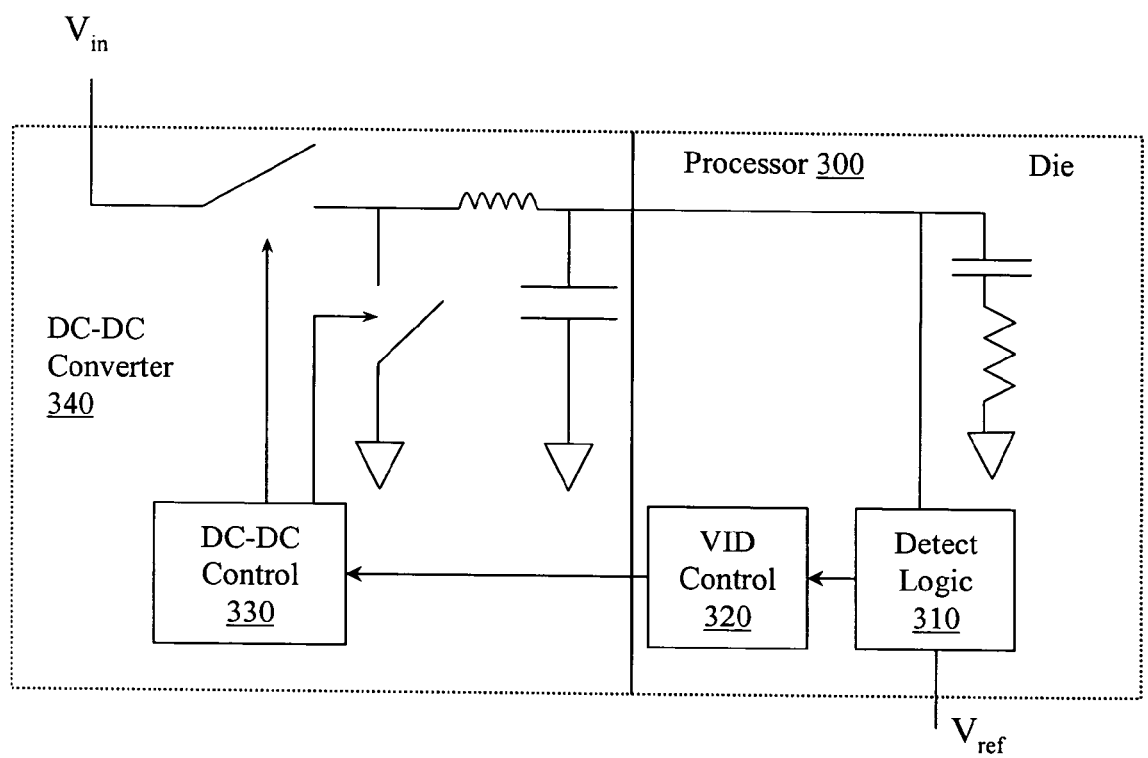
FIG. 3 illustrates various elements associated with an example frequency-scalable processor that is configured to detect and respond to a degradation of a provided direct current.

FIG. 3 illustrates a circuit diagram of various elements associated with a frequency-scalable processor configured to detect and respond to degradation of a direct current provided to the frequency-scalable processor. The right hand side of FIG. 3, labeled Processor 300, illustrates elements located in an example frequency scaleable processor while the left hand side of FIG. 3, labeled DC-DC Converter 340, illustrates elements located in an example direct current provider.

The DC-DC converter 340 portion illustrates a direct current with voltage $V_{in}$ being received by the DC-DC converter while the processor 300 portion illustrates a direct current with voltage $V_{ref}$ available for comparison to the voltage produced by the DC-DC converter 340 and provided to the load (the die) on the processor 300 portion. The processor 300 portion may include a VID (Voltage Identification) control logic 320 that is configured to control a DC-DC control logic 330 to cause the DC-DC converter 340 to produce a direct current with a desired voltage $V_{ref}$ from the direct current with the voltage $V_{in}$. In one example, the VID control logic 320 may control the DC-DC control 330 by providing a voltage identification code to the DC-DC control 330.

The processor 300 portion may also include a detect logic 310 that is configured to compare the voltage of the direct current provided by the DC-DC converter 340 to the voltage $V_{ref}$ desired by the load (die). If the detect logic 310 determines that the voltage provided to the load is outside acceptable parameters when compared to $V_{ref}$ and that a DC-DC converter 340 failure or power supply failure may be occurring, then the detect logic 310 may take actions including controlling the VID control logic 320 to cause the DC-DC control 330 to cycle down through smaller and smaller voltages to provide a graceful handling of power supply failure. The graceful handling may include saving state and/or data in the processor. Alternatively, if the DC-DC converter 340 is no longer controllable, then processor 300 may switch its frequencies to lower levels supportable by the voltage available due, for example, to capacitance in processor 300 and/or DC-DC converter 340.

In one example, to facilitate the graceful handling, and to provide the processor 300 with more time to respond to a power supply failure, the processor 300 may be configured with a degradation capacitor (not illustrated) configured to temporarily provide a direct current for processor 300.

Figure 4:
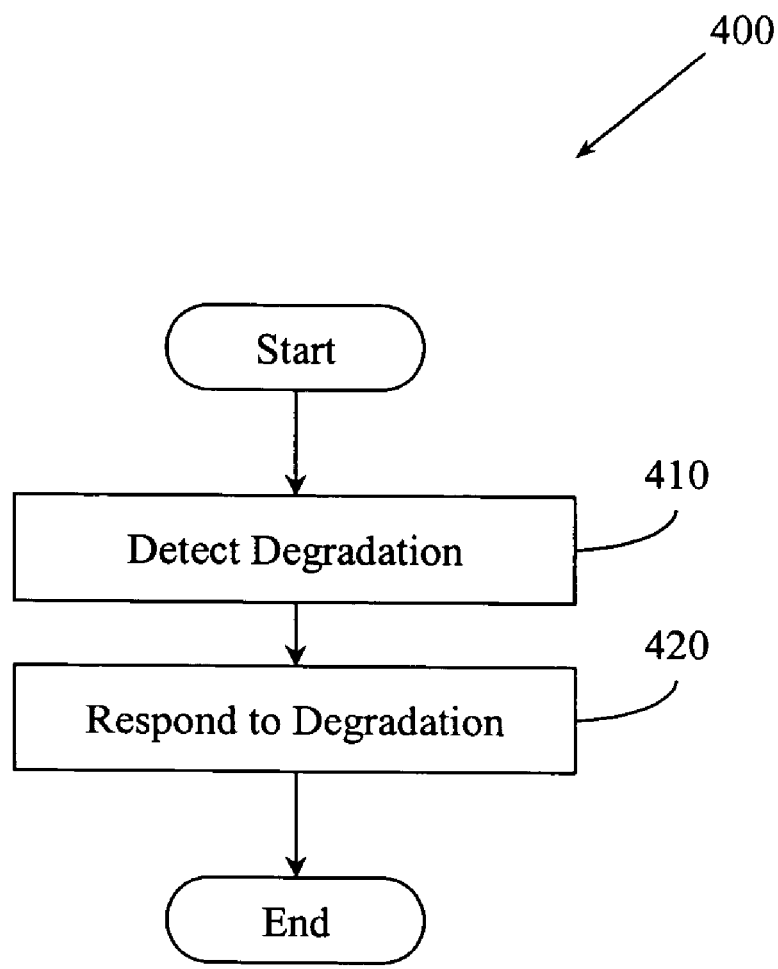
FIG. 4 illustrates an example method for detecting and responding to a degradation of a direct current provided to a processor.
Figure 5:
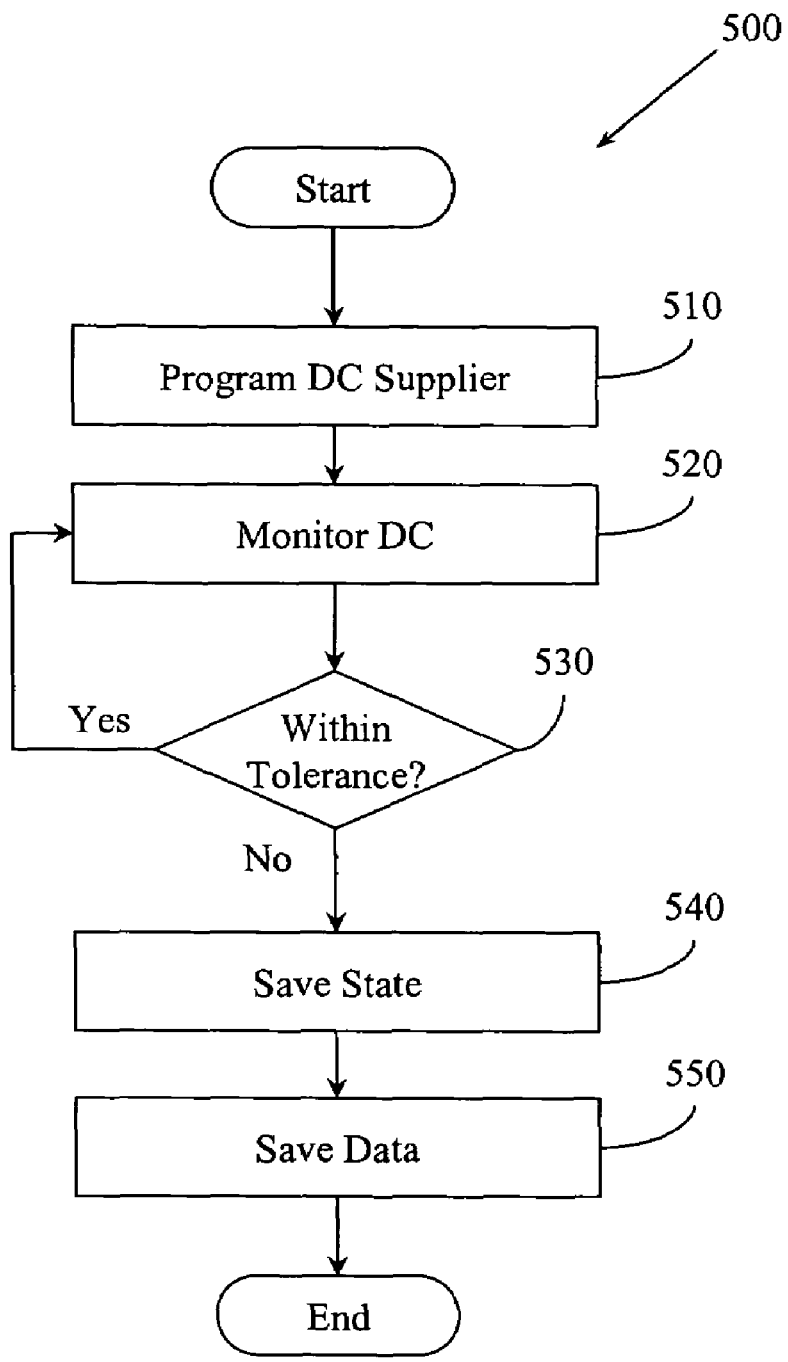
FIG. 5 illustrates another example method for detecting and responding to a degradation of a direct current provided to a processor.
Figure 6:
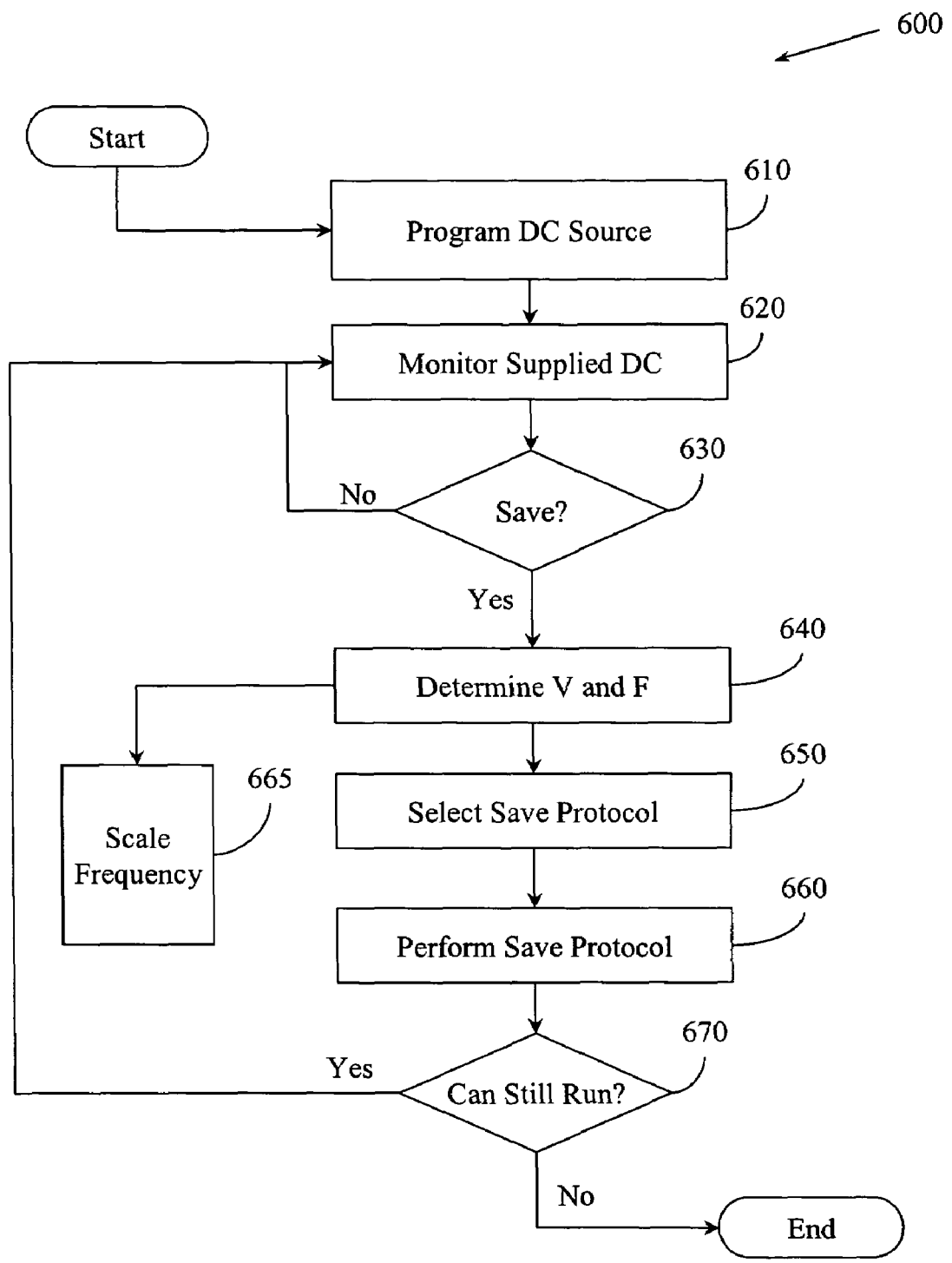
FIG. 6 illustrates another example method for detecting and responding to a degradation of a direct current provided to a processor.

Example methods may be better appreciated with reference to the flow diagrams of FIGS. 4, 5, and 6. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits like an analog circuit, a digital signal processor circuit, an application specific integrated circuit (ASIC), or other logic device. The flow diagrams are not intended to limit the implementation of the described examples. Rather, the diagrams illustrate functional information one skilled in the art could use to design/fabricate circuits, generate software, or use a combination of hardware and software to perform the illustrated processing.

FIG. 4 illustrates an example method 400 for detecting and responding to a degradation of a direct current provided to a processor. Method 400 may be performable, for example, in a frequency tracking processor. The frequency tracking processor may be performing, for example, a charge rationing protocol to address power consumption and/or heat dissipation concerns.

Method 400 may include, at 410, detecting a degradation in a direct current available to the processor. In one example, detecting a degradation in the direct current may include comparing the voltage of the direct current with a programmed reference voltage. For example, the processor may be configured to expect a direct current with a voltage between 1.4V and 1.6V. If the voltage provided to the processor falls below 1.4V, then a degradation may be signaled. The processor may have information concerning the programmed reference voltage because in one example, method 400 may include programming a direct current provider to provide the direct current having the programmed reference voltage. Configuring the processor to program the direct current provider facilitates having the processor reconfigure its operating frequency to follow the voltage down during a power supply or DC-DC converter failure.

Method 400 may also include, at 420, selectively responding to the degradation. Responding to the degradation, rather than simply crashing like a conventional processor, may facilitate recreating, in a second processor, a condition in the frequency scalable processor. Recreating the condition in the processor before, for example, a power supply failure, may facilitate the second processor completing a task underway in the processor that otherwise may have lost data, state, and/or not completed. In one example, selectively responding to the degradation may include storing a replication data that is configured to facilitate replicating, in the second processor, the condition in the frequency tracking processor. The replication data may include, for example, data from a register(s) in the processor, data in a cache(s) in the processor (e.g., L1, L2), data (e.g., instructions) in an instruction queue, and so on. The register data may come, for example, from an instruction register, a branch register, an address register, a control register, and so on. While register data, cache data, and instruction queue data are described, it is to be appreciated that other data associated with recreating a processor state may be saved. Similarly, while data in a cache is described, this data may be saved selectively based, for example, on whether a particular line of data in a cache is dirty.

The data to be stored may be destined for various locations that are provided with a direct current from a different source than the processor running method 400. For example, the data may be destined for another processor in a multi-processor server that includes the processor running method 400. Thus, the processor running method 400 may need to acquire the right to send data to the save location. Therefore, in one example, responding to the degradation may include arbitrating for a bus by issuing a panic transaction involved with the writing of the replication data, and so on. While a panic transaction and bus arbitration are described, it is to be appreciated that other actions involved in acquiring the right to store data in a second location may be taken.

Responding 420 to the degradation may also include reconfiguring a processor to operate at a lower frequency based on the degraded direct current. As the current continues to degrade, the processor may be reconfigured to operate at ever lower frequencies. Of course at some point an operational floor may be reached below which the processor may not be able to be reprogrammed.

While FIG. 4 illustrates various actions occurring in serial, it is to be appreciated that various actions illustrated in FIG. 4 could occur substantially in parallel. By way of illustration, a first process could detect degradations while a second process could respond to degradations. While two processes are described, it is to be appreciated that a greater and/or lesser number of processes could be employed and that lightweight processes, regular processes, threads, and other approaches could be employed.

FIG. 5 illustrates an example method 500 for detecting and responding to a degradation of a direct current provided to a processor. The degradation may be, for example, a voltage drop due to a DC-DC converter failure. Method 500 may be performed, for example, by a frequency tracking processor.

Method 500 may include, at 510, programming a direct current provider (e.g., DC-DC converter) to provide a direct current with a specified reference voltage. In one example, programming the direct current provider may include sending a voltage identification code (VID) from the frequency tracking processor to the direct current provider. Since the apparatus performing method 500 participates in programming the direct current provider, method 500 may have information available about the desired voltage to be provided by the direct current provider.

Method 500 may also include, at 520, monitoring the direct current provided by the direct current provider. For example, the information concerning the desired voltage may be compared to a detected voltage. Thus, at 530, a determination may be made concerning whether the direct voltage is within an acceptable tolerance. For example, if the direct voltage is less than the programmed reference voltage by more than a desired amount, then method 500 may include, at 540, saving a processor state and at 550 saving a processor data. The desired amount may be, for example, a fixed amount (e.g., 1V), a relative amount (e.g., 2%), an amount retrieved from a table, and so on. The state and/or data may be stored, for example, in a device provided with a second direct current. Selecting a device with a second direct current available facilitates mitigating damages associated with relying on a device so positioned to make it a single point of failure. The state and/or data may include, for example, register data, cache data, instruction queue data, and the like.

In one example, saving the state and/or data (e.g., storing the register data, the cache data, and the instruction queue data) may include an action like causing a data item to be sent to a remote backup processor that is operably connected to the processor via a system bus. The remote backup processor may have a second DC-DC converter available. The voltage may be different from that provided by the direct current provider. Similarly, saving the state and/or data may include an action like causing a data item to be sent to an independent random access memory (RAM) that is operably connected to the processor, or causing a data item to be stored in a cache memory associated with the processor, where the RAM and the cache memory are provided with a different direct current than that provided by the direct current provider.

It is to be appreciated that actions 540 and 550 may occur while the direct current available to a processor executing method 500 continues to degrade. Thus, method 500 may include, not illustrated, lowering the operating frequency of a processor executing actions 540 and 550. The frequency and voltage may be lowered based, at least in part, on the direct current voltage and/or voltage slew rate.

In one example, methodologies are implemented as processor executable instructions and/or operations stored on a computer-readable medium. Thus, in one example, a computer-readable medium may store processor executable instructions operable to perform a method that includes programming a direct current provider to provide a direct current having a programmed reference voltage. Programming the direct current provider may include providing a voltage identification code to the direct current provider. The method may also include selectively saving a processor state and/or a processor data upon determining that the direct current voltage is less than the desired reference voltage by more than a desired amount. While the above method is described being stored on a computer-readable medium, it is to be appreciated that other example methods described herein can also be stored on a computer-readable medium.

FIG. 6 illustrates an example method 600 for detecting and responding to a degradation of a voltage provided to a processor, including selecting a response protocol. Method 600 may be performable, for example, in a frequency tracking processor. Method 600 may include, at 610, programming a direct current source to provide a direct current with a desired reference voltage. For example a DC-DC converter that receives a direct current with 12V may be programmed to produce 5V. The DC-DC converter may be programmable to produce a range of voltages from, for example, 1V to 5V.

Method 600 may also include, at 620, monitoring a direct current provided by the DC-DC converter. For example, the voltage of the provided direct current may be monitored. Monitoring the voltage, and comparing it to the desired reference voltage may facilitate detecting a direct current degradation. Monitoring the voltage may also facilitate matching a processor operating frequency to the monitored voltage during, for example, action 660. In some examples, not all degradations may lead to a save response by method 600. By way of illustration, method 600 may have knowledge that a processor state backup recently occurred and that a potential data loss due to a power supply failure leading to processor deactivation can be handled by the backup. By way of further illustration, a processor may not be performing any meaningful work and thus no save is warranted. Thus, the method 600 may include determining, at 630, whether to respond to the direct current degradation. If the determination is No, then processing may return to 620 and/or may simply cease. But if the determination is Yes, then processing may move on to 640.

At 640, processor operating parameters like voltage, frequency, and so on may be determined. A frequency scaleable processor may substantially constantly and/or constantly monitor its operating voltage. Similarly, a frequency scaleable processor may store data concerning the frequency at which it is operating. Thus, method 600 may have information concerning the voltage of a direct current available to a processor, a frequency at which the processor is operating, and the like. These parameters may determine, at least in part, decisions like the type of data to be saved, the amount of data to be saved, and a destination for the data to be saved. Therefore, method 600 may include, at 650, selecting a save protocol that considers data type, amount, and/or destination.

Having selected the protocol, method 600 may continue, at 660, by performing the save protocol. Performing the selected save protocol may include actions like selectively saving a processor state, selectively saving a processor data, and so on. The saved state and/or data may include, for example, register data, cache data, instruction queue data, and the like. While performing the selected save protocol, the direct current may continue to degrade. Thus, it is to be appreciated that method 600 may include, at 665, concurrent with performing the protocol at 660, scaling a processor frequency based on the direct current available to the processor.

At 670, a determination may be made concerning whether additional instructions can be executed. For example, processor voltage available and operating frequency may be re-examined to determine how many, if any, more instructions may be executed.

Figure 7:
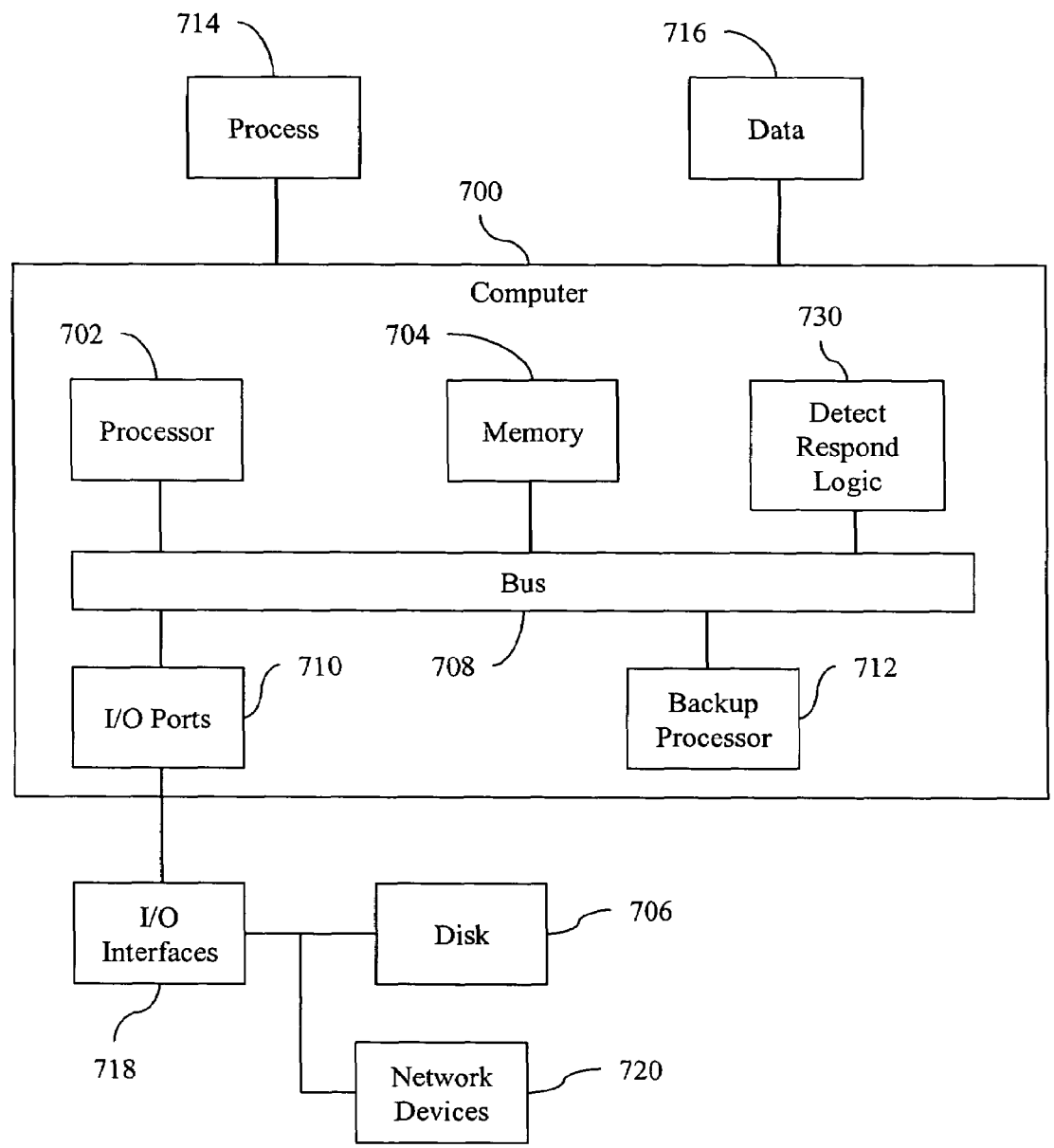
FIG. 7 illustrates an example computing environment in which example systems and methods illustrated herein may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a detect and respond logic 730 that is configured to facilitate detecting and/or responding to a voltage degradation. Thus, the detect and respond logic 730, whether implemented in hardware, firmware, software, and/or a combination thereof, may provide means for controlling a DC-DC converter to supply to a charge rationed processor 702 a desired voltage. The detect and respond logic 730 may also provide means for determining whether the direct current provided by the DC-DC converter achieves the desired voltage to within a desired tolerance and means for selectively saving information associated with the charge rationed processor 702. The detect and respond logic 730 may be permanently and/or removably attached to the computer 700.

In one example, processor 702 may be a 90 nm technology, 64 bit, frequency tracks voltage processor configured with two processor cores, at least a 20 megabyte L3 cache, and an instruction queue. While a single processor 702 is illustrated in computer 700, it is to be appreciated that processor 702 may be one processor in a multi-processor server.

Similarly, while detect and respond logic 730 is illustrated being operably connected to processor 702 via bus 708, it is to be appreciated that in one example the detect and respond logic 730 may be located inside processor 702 and/or directly connected to processor 702 without the intervening bus 708. Thus, in one example, processor 702 may be a frequency tracks voltage, 90 nm technology, 64 bit, integrated circuit with two processor cores. The integrated circuit may operate as one processor in a multi-processor server and be configured to receive a direct current from a DC-DC converter.

Processor 702 may include a voltage regulating logic that is configured to control the direct current provider to provide the selected voltage by providing a voltage identification code. Processor 702 may also include a response logic that is configured to selectively cause data like an architected state data, a dirty cache line data, and an instruction queue data to be provided to a device that has a second direct current available. The second device may be, for example, a remote backup processor 712 operably connected to the processor 702 via a system bus, an independent RAM operably connected to the processor 702, and a cache memory associated with the processor 702. Processor 702 may also include a detecting logic that is configured to analyze the direct current and to selectively control the response logic upon determining that the direct current voltage is more than 5% less than the selected voltage. While 5% is described as a tolerance, it is to be appreciated that other tolerances may be employed.

Generally describing an example configuration of the computer 700, the processor 702 can be a variety of various processors including dual microprocessor and other multi-processor architectures. The memory 704 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. The disk 706 can include, but is not limited to, devices like a magnetic disk drive, a solid state disk drive, a floppy disk drive, a tape drive, a Zip drive, a flash memory card, and/or a memory stick. Furthermore, the disk 706 can include optical drives like a CD-ROM, a CD recordable drive (CD-R drive), a CD rewriteable drive (CD-RW drive), and/or a digital video ROM drive (DVD ROM). The memory 704 can store processes 714 and/or data 716, for example. The disk 706 and/or memory 704 can store an operating system that controls and allocates resources of the computer 700.

The bus 708 can be a single internal bus interconnect architecture and/or other bus or mesh architectures. While a single bus is illustrated, it is to be appreciated that computer 700 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 700 may interact with input/output devices via i/o interfaces 718 and input/output ports 710. Input/output devices can include, but are not limited to, a keyboard, a microphone, a pointing and selection device, cameras, video cards, displays, disk 706, network devices 720, and the like. The input/output ports 710 can include but are not limited to, serial ports, parallel ports, and USB ports.

The computer 700 can operate in a network environment and thus may be connected to network devices 720 via the i/o devices 718, and/or the i/o ports 710. Through the network devices 720, the computer 700 may interact with a network. Through the network, the computer 700 may be logically connected to remote computers. The networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 720 can connect to WAN technologies including, but not limited to, point to point links, circuit switching networks like integrated services digital networks (ISDN), packet switching networks, and digital subscriber lines (DSL).

Figure 8:
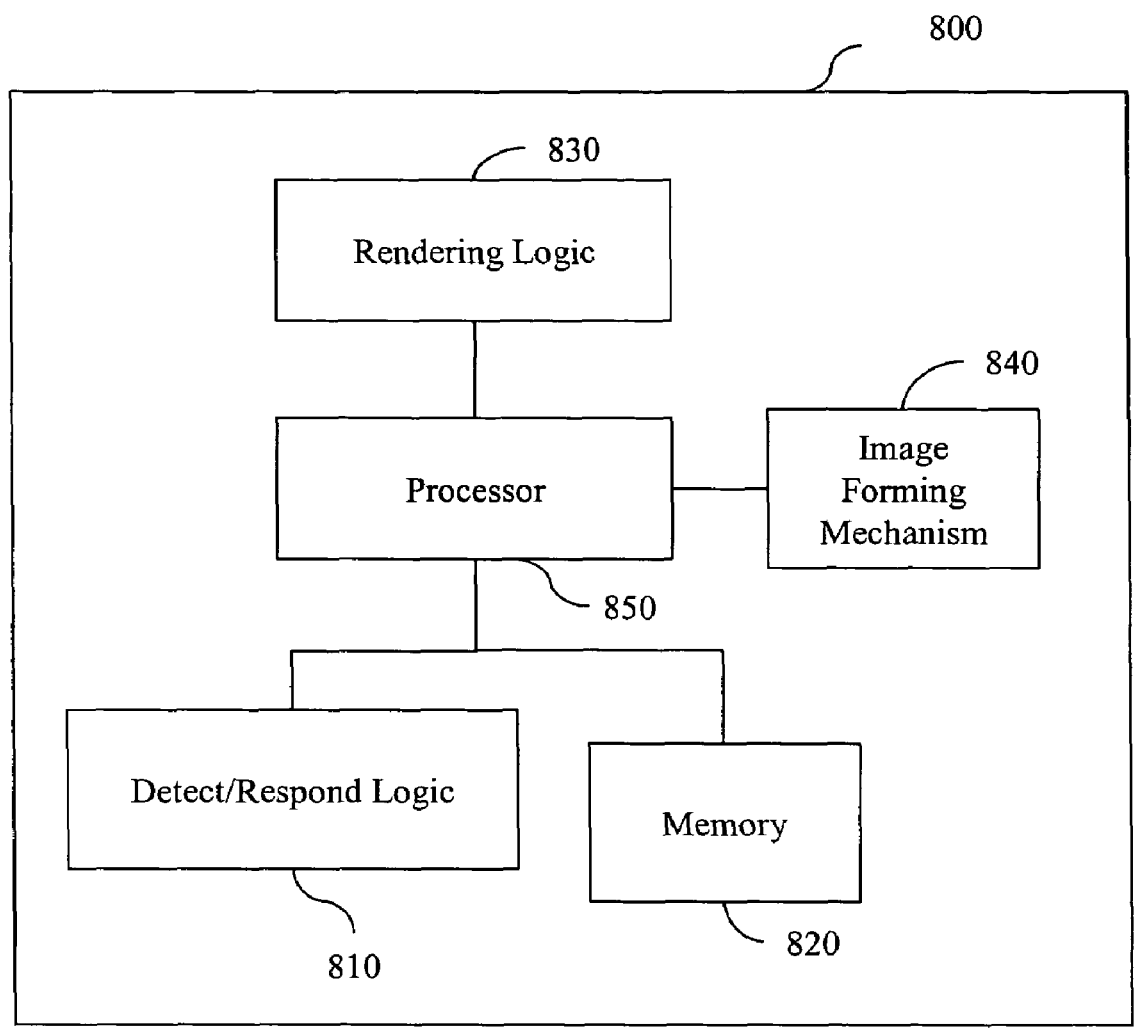
FIG. 8 illustrates an example image forming device in which example systems and methods illustrated herein may operate.

FIG. 8 illustrates an example image forming device 800 that includes a detect and respond logic 810 similar to the example systems described herein. The detect and respond logic 810 may include logic configured to perform executable methods like those described herein. The detect and respond logic 810 may be permanently and/or removably attached to the image forming device 800. While detect and respond logic 810 is illustrated external to processor 850, it is to be appreciated that in some examples the detect and respond logic 810 will be located inside processor 850. Similarly, while image forming device 800 is illustrated with a single processor 850, it is to be appreciated that image forming device 800 may have multiple processors.

The image forming device 800 may receive print data to be rendered. Thus, image forming device 800 may also include a memory 820 configured to store print data or to be used more generally for image processing. The image forming device 800 may also include a rendering logic 830 configured to generate a printer-ready image from print data. Rendering varies based on the format of the data involved and the type of imaging device. In general, the rendering logic 830 converts high-level data into a graphical image for display or printing (e.g., the print-ready image). For example, one form is ray-tracing that takes a mathematical model of a three-dimensional object or scene and converts it into a bitmap image. Another example is the process of converting HTML into an image for display/printing. It is to be appreciated that the image forming device 800 may receive printer-ready data that does not need to be rendered and thus the rendering logic 830 may not appear in some image forming devices.

The image forming device 800 may also include an image forming mechanism 840 configured to generate an image onto print media from the print-ready image. The image forming mechanism 840 may vary based on the type of the imaging device 800 and may include a laser imaging mechanism, other toner-based imaging mechanisms, an ink jet mechanism, digital imaging mechanism, or other imaging reproduction engine. A processor 850 may be included that is implemented with logic to control the operation of the image-forming device 800. In one example, the processor 850 includes logic that is capable of executing Java instructions. Other components of the image forming device 800 are not described herein but may include media handling and storage mechanisms, sensors, controllers, and other components involved in the imaging process. While detect/respond logic 810 is illustrated external to processor 850, it is to be appreciated that in some examples processor 850 may incorporate detect/respond logic 810.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A processor configured to receive a voltage from a direct current provider, comprising:
   a voltage regulating logic configured to control the direct current provider to provide a selected voltage;
   a response logic configured to selectively cause a data item associated with the processor to be provided to a device supplied with a second voltage from a second direct current provider; and
   a detecting logic operably connected to the voltage regulating logic and the response logic, the detecting logic being configured to analyze the voltage and to selectively control the response logic upon determining that the voltage differs from the selected voltage by an amount exceeding a tolerance.

2. The processor of claim 1, the direct current provider being a DC-DC converter.

3. The processor of claim 1, the voltage regulating logic being configured to control the direct current provider by providing a voltage identification code.

4. The processor of claim 1, the detecting logic comprising:
   a voltage monitor logic configured to monitor the voltage;
   a current monitor logic configured to monitor the current provided by the direct current provider; and
   a frequency monitor logic configured to monitor a frequency at which the processor is operating.

5. The processor of claim 1, the data item comprising one or more of, an architected state data, a dirty cache line data, and an instruction queue data.

6. The processor of claim 1, the response logic being configured to cause the data item to be provided to a remote backup processor operably connected to the processor via a system bus.

7. The processor of claim 1, the response logic being configured to cause the data item to be provided to an independent random access memory (RAM) operably connected to the processor.

8. The processor of claim 1, the response logic being configured to cause the data item to be provided to a cache memory associated with the processor.

9. The processor of claim 1, the response logic being configured to scale the processor operating frequency based, at least in part, on the voltage available from the direct current provider.

10. The processor of claim 1, comprising:
    a capacitor configured to provide a temporary direct current to the processor.

11. The processor of claim 1, the tolerance being +/−2.5%.

12. The processor of claim 1, the tolerance being +/−5% over a period of time exceeding a time limit.

13. The processor of claim 12, the time limit being directly related to a frequency at which the processor is operating.

14. The processor of claim 1, the detecting logic being configured to control the response logic upon determining that one or more of, a direct current voltage history data, a processor current history data, and a processor frequency history data indicate a direct current degradation likelihood exceeding a pre-defined likelihood limit.

15. The processor of claim 1, the processor being configured to have its operating frequency directly related to the direct current voltage.

16. The processor of claim 1, the processor being a 90 nm technology, 64 bit, frequency tracks voltage processor configured with two processor cores, at least a 20 megabyte L3 cache, and an instruction queue.

17. The processor of claim 1, the processor being one processor in a multi-processor server.

18. The processor of claim 16, the processor being one processor in a multi-processor server.

19. A frequency tracks voltage, 90 nm technology, 64 bit, integrated circuit with two processor cores, the integrated circuit operating as one processor in a multi-processor server, the integrated circuit being configured to receive a voltage from a DC-DC converter, comprising:
    a voltage regulating logic configured to control the direct current provider to provide a selected voltage by providing a voltage identification code;
    a response logic configured to selectively cause one or more of, an architected state data, a dirty cache line data, and an instruction queue data to be provided to a device provided with a second voltage from a second direct current provider, the second device being one or more of, a remote backup processor operably connected to the processor via a system bus, an independent random access memory (RAM) operably connected to the processor, and a cache memory associated with the processor; and
    a detecting logic operably connected to the voltage regulating logic and the response logic, the detecting logic being configured to analyze the voltage and to selectively control the response logic upon determining that the voltage differs by more than 5% from the selected voltage.

20. A method performable in a frequency tracking processor, comprising:
    programming a direct current provider to provide a programmed voltage by providing a voltage identification code to the direct current provider from the frequency tracking processor;
    detecting a degradation of a direct current by monitoring a voltage; and
    upon determining that the voltage is less than the programmed voltage by more than a desired amount, selectively saving a processor state and a processor data by storing in a device provided with a second voltage one or more of, a register data, a cache data, and an instruction queue data, and selectively reconfiguring the operating frequency of the frequency tracking processor,
    where storing the register data, the cache data, and the instruction queue data includes one or more of, causing a data item to be sent to a remote backup processor operably connected to the processor via a system bus, where the remote backup processor is provided with a second voltage different from the voltage provided by the direct current provider, causing a data item to be sent to an independent random access memory (RAM) operably connected to the processor, where the independent RAM is provided with a second voltage different from the voltage provided by the direct current provider, and causing a data item to be stored in a cache memory associated with the processor, where the cache memory is provided with a second voltage different from the voltage provided by the direct current provider.

21. A computer-readable medium storing processor executable instructions operable to perform a method, the method comprising:
    programming a direct current provider to provide a programmed voltage by providing a voltage identification code to the direct current provider;
    detecting a degradation of a direct current by monitoring a voltage; and
    upon determining that the voltage differs from the programmed voltage by more than a desired amount, selectively saving a processor state and a processor data by storing one or more of, a register data, a cache data, and an instruction queue data,
    where storing the register data, the cache data, and the instruction queue data includes one or more of, causing a data item to be sent to a remote backup processor operably connected to the processor via a system bus, where the remote backup processor is provided with a second voltage different from the voltage provided by the direct current provider, causing a data item to be sent to an independent random access memory (RAM) operably connected to the processor, where the independent RAM is provided with a second voltage different from the voltage provided by the direct current provider, and causing a data item to be stored in a cache memory associated with the processor, where the cache memory is provided with a second voltage different from the voltage provided by the direct current provider.

22. A method performable in a frequency tracking processor, comprising:
    programming a direct current source to provide a direct current with a desired reference voltage;
    detecting a direct current degradation by comparing the direct current voltage with the desired reference voltage; and
    selectively responding to the direct current degradation upon determining that the direct current voltage differs from the desired reference voltage by more than a desired amount and upon determining that a data save should occur, where selectively responding to the direct current degradation includes selecting a save protocol to be performed by the frequency tracking processor and where determining that a data save should occur includes examining one or more of, a frequency tracking processor state, a frequency at which the frequency tracking processor is operating, a voltage available to the frequency tracking processor, and a slew rate of the voltage being provided to the frequency tracking processor,
    performing the selected save protocol, where the selected save protocol includes one or more of, selectively saving a processor state, and selectively saving a processor data by storing one or more of, a register data, a cache data, and an instruction queue data, and
    after performing the selected save protocol, attempting to determine whether the frequency tracking processor is capable of executing more instructions by examining a frequency at which the frequency tracking processor is operating and a voltage available to the frequency tracking processor.

23. A computer, comprising:
    a direct current source;
    a frequency scalable processor configured to detect and respond to a degradation in a direct current provided to the frequency scalable processor, the frequency scalable processor being configured to receive a voltage from a direct current provider, the frequency scalable processor comprising:
        a voltage regulating logic configured to control the direct current provider to provide a selected voltage;
        a response logic configured to selectively cause a data item associated with the processor to be provided to a device supplied with a second voltage from a second direct current provider; and
        a detecting logic operably connected to the voltage regulating logic and the response logic, the detecting logic being configured to analyze the voltage and to selectively control the response logic upon determining that the voltage differs from the selected voltage by an amount exceeding a tolerance; and
    a DC/DC converter operably connected to the direct current source and the frequency scalable processor, the DC/DC converter being programmable to accept a first direct current from the direct current source and to supply the direct current provided to the frequency scalable processor.

24. A printer, comprising:
    a direct current source;
    a frequency scalable processor configured to detect and respond to a degradation in a direct current provided to the frequency scalable processor, the frequency scalable processor being configured to receive a voltage from a direct current provider, the frequency scalable processor comprising:
        a voltage regulating logic configured to control the direct current provider to provide a selected voltage;
        a response logic configured to selectively cause a data item associated with the processor to be provided to a device supplied with a second voltage from a second direct current provider; and
        a detecting logic operably connected to the voltage regulating logic and the response logic, the detecting logic being configured to analyze the voltage and to selectively control the response logic upon determining that the voltage differs from the selected voltage by an amount exceeding a tolerance; and
    a DC/DC converter operably connected to the direct current source and the frequency scalable processor, the DC/DC converter being programmable to accept a first direct current from the direct current source and to supply the direct current provided to the frequency scalable processor.

* * * * *